Figure 1:
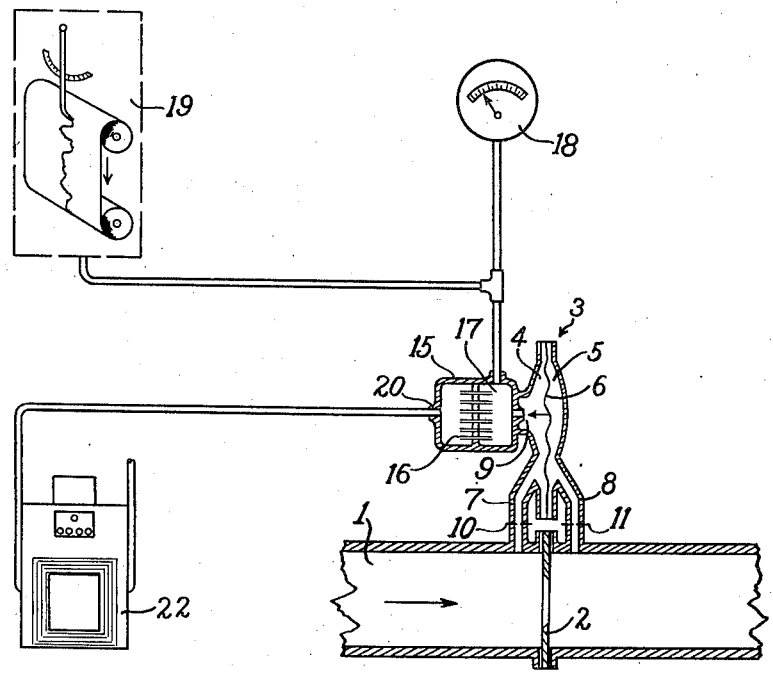

June 23, 1936.   J. M. NAIMAN   2,044,806
FLUID FLOW MEASURING MEANS
Filed Dec. 24, 1934

Inventor
Julius M. Naiman
By Morris Spector
Attorney

Patented June 23, 1936

2,044,806

UNITED STATES PATENT OFFICE 2,044,806

FLUID FLOW MEASURING MEANS

Julius M. Naiman, Chicago, Ill.

Application December 24, 1934, Serial No. 759,029

6 Claims. (Cl. 73—68)

This invention relates to means for measuring the flow of fluids, whether liquid or gas, and is particularly concerned with the construction of orifice plates and their position in the fluid stream. In its more specific aspects the invention is concerned with the construction and position of an orifice plate in a proportionate meter.

In the measurement of fluid flow by proportional meters a small and presumably constant proportion of the fluid in the pipe in diverted and accurately measured. If the amount diverted is a constant proportion of the total flow, then the total flow is thus ascertained. Any variation of this proportion, unless taken into consideration, will cause an error in the final result. The means for determining the proportion of the fluid diverted generally comprises an orifice plate in the main pipe, an orifice plate in the small tube through which the fluid is diverted, and means for maintaining such a rate of flow through the orifice in the second mentioned plate that the difference in pressure on the two sides thereof is exactly the same as the difference in pressure on the two sides of the orifice in the main pipe. In such a system the rate of flow through the small orifice bears a fixed relation to the rate of flow through the large orifice only if the ratio of the coefficients of discharge of the two orifices does not change with changes in velocity of fluid flow. I have found that with orifices of the present construction there is a substantial change in the coefficient of discharge with change in velocity, where the diameter of the orifice is very small, as is the case in connection with proportional meters. For this reason errors as great as 15%, or more, may be introduced. This has greatly limited the use of proportional meters.

I have found that the change in coefficient of discharge of the orifice can be substantially eliminated by changing the construction of the orifice plate or its position with reference to the direction of the fluid stream.

Although a good deal of attention has been given to the form of the upstream side of orifice plates, the downstream side has received very little consideration. I have found that with a very small orifice, one whose radius is of the magnitude of 0.02 inch, the shape of the downstream side is of primary importance. With an ordinary orifice of this size, the change of the coefficient of discharge with changing conditions of flow may be very great, in the order of 15%. By properly designing the orifice, with particular reference to the shape of the discharge side thereof, this source of error can be substantially eliminated. I have found that the best results are obtained by using a sharp edge orifice with the sharp edge thereof on the downstream side, instead of on the upstream side, as was the usual prior practice. I have found, also, that with such an orifice plate the downstream side should make an angle, preferably 90°, and certainly more than 75°, with the direction of flow of the fluid stream at the center of the orifice.

Knife edge orifices are generally of larger diameter on one side of the orifice plate than on the other, the taper from the larger to the smaller end being necessary to form the knife edge. Such orifice plates have invariably been placed with the smaller diameter side of the orifice facing upstream, so that the orifice tapers outwardly beyond the knife edge. I have found that this is fundamentally wrong, and the cause of much error, in the case of a very small orifice. For best results the orifice plate should be at an angle of approximately 90° to the fluid stream at the point of egress from the knife edge while maintaining the angle of approach on the upstream side at a proper value not to disturb the basic effect of the orifice edge on the stream lines. An angle of 75° or more, with the center line of the pipe, was found satisfactory. In other words, in the present practice, the orifice plate should be reversed with reference to the direction of fluid flow, the customary 45° taper should be increased to at least 75°, and the width of the orifice edge reduced to 10% or less of the orifice diameter.

With the above in view, it is an object of the present invention to provide an improved proportionate flow measuring apparatus which shall have a high degree of accuracy over a wide range. It is a further object of the present invention to provide an improved orifice plate that will have a constant coefficient of discharge over a wide range.

Figure 2:
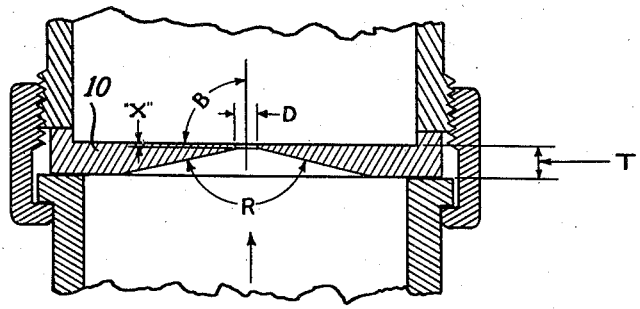

The attainment of the above and further objects of the present invention will be apparent from the following specification taken in conjunction with the accompanying drawing forming a part thereof;

In the drawing:

Figure 1 is a diagrammatic view of a flow meter embodying the principles of my invention; and Figure 2 is an enlarged view of one of the orifice plates of Figure 1.

At 1 is indicated a main pipe through which flows a fluid, in this case a gas, in the direction indicated by the arrow. A measuring resistance, which may be an orifice plate, nozzle, Venturi tube, or the like, is indicated at 2. A flow deviator 3, containing two chambers 4 and 5 separated by a very sensitive featherweight diaphragm 6, is connected by short connections 7 and 8 with the pipe 1 on the upstream and downstream sides, respectively, of the measuring resistance 2. The diaphragm 6 controls a needle valve 9, that controls the outlet from the chamber 4. In the connections 7 and 8 are orifice plates 10 and 11, respectively, of identical size, and of a shape to be more fully described as this description proceeds. The orifice plate 10 has a measuring function, which will be presently described. The orifice 11 is for the purpose of synchronizing the filling of the two chambers 4 and 5, and to prevent overloading of one side of the diaphragm when the flow is first started or any sudden change in pressure occurs.

A capillary cartridge 15 is connected to the outlet of the chamber 4. This cartridge contains a number of capillary tubes 16 that break up the fluid flow into straight line streams, so that the pressure in the chamber 17 necessary to overcome this resistance is directly proportionate to the volume of flow. The pressure is measured by a pressure gauge 18, or by a pressure recorder 19, which can, therefore, be calibrated to show the rate of flow, in cubic feet per minute. The flow from the cartridge 15 may be allowed to escape directly to the atmosphere at 20, or indirectly through an integrating gas meter 22.

When gas begins to flow through the main pipe, a pressure difference is set up by the orifice plate 2. The lower pressure is immediately communicated to the chamber 5, the higher pressure being communicated to the chamber 4. The preponderance of pressure in the chamber 4 over the chamber 5 causes the diaphragm 6 to open the valve 9, thus permitting gas to flow from the main pipe 1, through the connection 7 having the orifice 10 therein. There is a pressure drop resulting from the flow of gas past the orifice 10, with the result that the pressure difference on the two sides of the diaphragm 6 is reduced. Equilibrium is reached when the diaphragm 6 maintains the valve 9 open to such an amount that the flow through the orifice 10 in the connection 7 produces a drop in pressure equal to the drop produced at the orifice 2, less a very small amount required to flex the featherweight diaphragm, which may be neglected. The net effect is that the pressures on the upstream side of the orifices 2 and 10 are equal, and the pressures on the downstream side of these two orifices are also equal. The differential pressures and the static pressures on the two orifice plates are the same and the temperatures of the gases are the same. Therefore, the specific gravities are also the same, and, in the absence of any change in the relationship of the constants of the two orifices, the flow through the orifice 10 will be a fixed proportion of the flow through the orifice 2, and the meters 18, 19, and 22 may be calibrated to read in terms of the flow through the main pipe 1.

The flow through the orifice 10 is a very small fraction of the flow through the orifice 2, the orifice 10 being so small that the flow therethrough is, say, 1/10,000 of the flow through the orifice 10. This means that the diameter of the orifice 10 must be exceedingly small. I have found that with orifices of such small diameter, as now constructed, there is an appreciable change in the coefficient of discharge as the rate of flow changes. Unless the change in coefficient of discharge of the orifice 10 bears a fixed direct proportion to the change of coefficient of discharge of the orifice 2, there will be a change in the proportion of fluid flow through the connection 7 as the total flow through the main varies. Unfortunately, with present-day standard types of orifices, the change in coefficient of discharge of the pin-hole orifice 10 is in no way related to the change of coefficient of discharge, if any, of the large orifice 2. For this reason, the range of use of proportionate meters has been quite limited.

I have discovered that by using an orifice plate 10 of a particular construction I can substantially eliminate practically all change in coefficient of discharge under changing velocity. An orifice plate constructed in accordance with my invention is illustrated in Figure 2, the same being drawn very much enlarged. In one construction that I have made and tested, the orifice plate 10 was a polished stainless steel disc of a thickness "T" of 1/16 inch. The diameter "D" of the orifice opening was 0.042 inch, which is only a fraction of half a centimeter. The angle of approach, on the upstream side, indicated at "R", was 155°. The thickness "X", of the edge or throat portion of the orifice, should be less than 15% of the diameter D, and in the preferred construction was not more than 10% of the diameter "D", which means that the throat portion was substantially a knife edge. The angle "B", between the central axis of the fluid stream and the downstream side of the orifice plate, at the orifice, was 90°.

I have found that the angle "B", on the downstream side of the orifice plate, is the controlling angle that determines whether or not the coefficient of discharge will change with change in velocity through the orifice, in an orifice plate of this construction. I have found that this angle "B" must exceed 75°, the particular angle 90° being the preferred angle. In the claims, where this angle is specified as being "substantially 90°" it is to be understood that a variation of 15° from the optimum value of 90° is within the scope of the limitation "substantially" 90°. Tests of an orifice of this construction have shown that the coefficient of discharge does not vary more than 2% when the rate of flow through the orifice plate varies from about 10% of the meter rating to 100%. On different tests these results were duplicated within 1/10 of 1% over correspondingly wide ranges of fluid flow.

It is to be noted that this orifice plate is placed in the fluid stream with its knife edge directly opposite to what is now considered standard practice, that is, the sharp angle "B", of 90°, is on the downstream side rather than on the upstream side. I have found that, if this same orifice is reversed in the fluid stream, the coefficient of discharge is about 15% less at a flow of 100% of the meter rating than at 10%. It is apparent that such a wide variation of coefficient of discharge of the orifice plate is generally intolerable for proportionate flow metering over the range of flows indicated. On the other hand, when the orifice plate is in the fluid stream in the direction indicated in Figure 2, the maximum change of about 2%, or less, in the coefficient of discharge over the wide range of flow is not objectionable.

While I have here shown the orifice plate 10 of particular dimensions, it is to be understood that the present invention is not limited to these precise dimensions, the same being merely illustrative of the principles of the invention. Furthermore, I have shown the large orifice 2 in the main 1 as being of the same type of construction as that of the orifice 10. It is, however, to be understood that it is within the purview of the present invention to use an orifice of the type shown in Figure 2 in the connection 7 while using any other type of orifice in the main pipe 1, or using any other type of resistance in place of the orifice 2, such as, a venturi, a nozzle, or the like. Also, while in the system here shown the gas that leaves the chamber 4 actuates an indicating apparatus to indicate the total flow or the rate or flow, it is apparent that the indicating parts of the apparatus, such as the pressure gauge 18 which indicates the rate of flow, or the integrating gas meter 22, could be replaced by other apparatus which functions to exercise control, or to actuate something, when the rate of flow or the total flow are of specified values.

In compliance with the requirements of the patent statutes, I have here shown and described a preferred embodiment of my invention. It is, however, to be understood that the invention is not limited to the precise construction herein shown. What I consider new and desire to secure by Letters Patent is:

1. A flow meter wherein there is provided means for creating a pressure differential which varies as a function of the velocity of flow of fluid to be measured, and wherein there is provided an auxiliary fluid passageway having an orifice member therein, and means for permitting a flow through the orifice member of a relatively small portion of the total flow and regulating that flow to maintain the pressure differential on the two sides of the orifice member a predetermined function of the first mentioned pressure differential, characterized by the fact that the orifice converges from a maximum opening on the upstream side thereof to a minimum opening on the downstream side thereof, the angle between the downstream side of the orifice member and the center line of the fluid stream being substantially 90°.

2. A flow meter wherein there is provided means for creating a pressure differential which varies as a function of the velocity of flow of fluid to be measured, and wherein there is provided an auxiliary fluid passageway having an orifice member therein, and means for permitting a flow through the orifice member of a relatively small portion of the total flow and regulating that flow to maintain the pressure differential on the two sides of the orifice member a predetermined function of the first mentioned pressure differential, characterized by the fact that the orifice converges from a maximum opening on the upstream side thereof to a minimum opening on the downstream side thereof and has a knife edge throat on the downstream side thereof, the angle between the downstream side of the orifice member and the center line of the fluid stream being substantially 90°.

3. A flow meter wherein there is provided means for creating a pressure differential which varies as a function of the velocity of flow of fluid to be measured, and wherein there is provided an auxiliary fluid passageway having an orifice member therein, said orifice member in the auxiliary fluid passageway having an orifice opening of a diameter of the magnitude of a fraction of a half a centimeter and means for permitting a flow through the orifice member of a relatively small portion of the total flow and regulating that flow to maintain the pressure differential on the two sides of the orifice member a predetermined function of the first mentioned pressure differential, characterized by the fact that, at the orifice, the angle between the downstream side of the orifice member and the center line of the fluid stream through the orifice exceeds 75°.

4. In a system wherein fluid flows, means for producing an auxiliary flow which is a relatively small and proportionate part of the total flow, said means including an orifice plate having an orifice opening of the magnitude of a fraction of a half a centimeter, the downstream side of the plate, at the orifice, making a larger angle with the direction of fluid flow through the center of the orifice than does the upstream side thereof, said angle, on the downstream side exceeding 75°.

5. In a pipe wherein fluid flows, means for producing an auxiliary flow which is a relatively small and proportionate part of the total flow, said means including an orifice plate having an orifice of a larger diameter on its upstream side than on its downstream side, the orifice being tapered inwardly from the upstream side thereof to substantially a knife edge at its downstream, and its downstream side making an angle exceeding 75° with the central axis of the orifice in the direction of fluid flow, the orifice opening in the orifice plate being of a magnitude of a fraction of a half a centimeter.

6. A system wherein fluid flows and wherein there is provided means for creating a pressure differential which varies as a function of the velocity of flow of fluid, and wherein there is provided an auxiliary fluid passageway having an orifice member therein, said orifice member in the auxiliary fluid passageway having an orifice opening of a diameter of the magnitude of a fraction of a half a centimeter, and means for permitting a flow through the orifice member of a relatively small portion of the total flow and regulating that flow to maintain the pressure differential on the two sides of the orifice member a predetermined function of the first mentioned pressure differential, characterized by the fact that, at the orifice, the angle between the downstream side of the orifice member and the center line of the fluid stream through the orifice exceeds 75°, and the length of the edge of the orifice parallel to the fluid stream is less than 15% of the diameter of the orifice.

JULIUS M. NAIMAN.